(12) United States Patent
O'Bryant et al.

(10) Patent No.: US 7,679,943 B2
(45) Date of Patent: Mar. 16, 2010

(54) UNINTERRUPTABLE POWER SUPPLY

(75) Inventors: Greg O'Bryant, Madison, AL (US); Erik S. Bahl, Madison, AL (US); Bruce Imsand, Madison, AL (US)

(73) Assignee: MaxVision Corporation, Madison, AL (US)

( * ) Notice: Subject to any disclaimer, the term of this patent is extended or adjusted under 35 U.S.C. 154(b) by 297 days.

(21) Appl. No.: 11/620,772

(22) Filed: Jan. 8, 2007

(65) Prior Publication Data
US 2008/0164761 A1 Jul. 10, 2008

(51) Int. Cl.
*H02J 1/10* (2006.01)
(52) U.S. Cl. ....................................................... 363/65
(58) Field of Classification Search .................... 363/65, 363/26; 307/64, 66
See application file for complete search history.

(56) References Cited

U.S. PATENT DOCUMENTS

| | | | | | |
|---|---|---|---|---|---|
| 4,685,039 | A | * | 8/1987 | Inou et al. ...................... 363/16 |
| 4,860,185 | A | * | 8/1989 | Brewer et al. .................. 363/41 |
| 5,251,097 | A | * | 10/1993 | Simmons et al. ........ 361/679.53 |
| 5,465,011 | A | * | 11/1995 | Miller et al. ................... 307/64 |
| 5,684,385 | A | * | 11/1997 | Guyonneau et al. ............ 307/46 |
| 6,157,168 | A | * | 12/2000 | Malik .......................... 320/128 |
| 6,218,744 | B1 | * | 4/2001 | Zahrte et al. ................... 307/64 |
| 6,753,622 | B2 | * | 6/2004 | Oughton, Jr. .................. 307/64 |
| 6,917,125 | B2 | * | 7/2005 | Yim .............................. 307/66 |
| 7,053,502 | B2 | * | 5/2006 | Aihara et al. .................. 307/46 |
| 7,259,476 | B2 | * | 8/2007 | Frey .............................. 307/64 |
| 7,274,112 | B2 | * | 9/2007 | Hjort et al. .................... 307/64 |
| 2004/0125626 | A1 | * | 7/2004 | Kanouda et al. ............. 363/125 |

* cited by examiner

*Primary Examiner*—Adolf Berhane
*Assistant Examiner*—Yemane Mehari
(74) *Attorney, Agent, or Firm*—David E. Mixon; Bradley Arant Boult Cummings LLP

(57) ABSTRACT

The present invention is an apparatus for providing an uninterruptible power supply for an electronic device. The apparatus includes an AC-to-DC power supply that receives an external AC voltage supply and outputs a DC voltage to the electronic device. The power supply includes a bridge rectifier that rectifies the AC voltage from the external AC voltage supply, a boost power factor correction (PFC) converter that boosts the rectified voltage, and a line isolated DC-to-DC converter that changes the boosted voltage to the operating voltage range of the electronic device. The apparatus also includes an uninterruptible power supply (UPS) subsystem that contains, a controller that monitors the external AC voltage supply for interruptions, and a high voltage isolated DC-to-DC (HVDC) converter that supplies high voltage DC power directly to the PFC converter if the controller detects an interruption in the external AC voltage supply.

23 Claims, 5 Drawing Sheets

UNINTERRUPTABLE POWER SUPPLY

FIELD OF THE INVENTION

The invention relates generally to a power supply for electronic devices. More specifically, the invention relates to an uninterruptible power supply.

BACKGROUND ART

A continuous and reliable power supply is necessary for almost all electronic devices. FIG. 1 shows a block diagram of an AC to DC power supply system in accordance with the prior art. As with most power supplies for electronic devices, it converts alternating current (AC) to direct current (DC) that is output 22 to the device. In this example, the AC input 10 will typically range from 90-264 Volts at a frequency of 50-60 Hz. Once the AC switch 12 is closed the AC power is applied to the AC to DC Power Supply 14. The power supply 14 includes a Bridge Rectifier 16 that converts the AC into a unidirectional current. The use of a bridge rectifier circuit is well known to one of ordinary skill in the art. The rectified output is then input into a Boost PFC (Power Factor Correction) Converter 18. The boost PFC converter maintains a constant DC bus voltage on its output while drawing input current that is in phase with the input voltage. The output of the boost PFC converter is 375 Volts DC in this example. Finally, the Line Isolated DC to DC converter 20 creates the necessary operating voltages for the electronic device. These voltages are delivered as the output of the power supply to the electronic device.

Prior Art solutions to provide a backup power source have involved the use of various sizes of batteries. However, these backups typically involve some type of interruption of the power supply while the backup battery is engaged. Additionally, most batteries cannot provide an adequate backup power supply for a necessary period of time without adding a great deal of weight to the system. Therefore, an efficient uninterruptible power supply is desired.

SUMMARY OF THE INVENTION

In some aspects, the invention relates to an apparatus for providing an uninterruptible power supply for an electronic device, comprising: an AC-to-DC power supply that receives and external AC voltage supply and outputs a DC voltage to the electronic device comprising, a bridge rectifier that receives AC voltage from the external AC voltage supply and rectifies the voltage, a boost power factor correction (PFC) converter that boosts the rectified voltage from the bridge rectifier, and a line isolated DC-to-DC converter that changes the boosted voltage to the operating voltage range of the electronic device; and an uninterruptible power supply (UPS) subsystem comprising, a controller that monitors the external AC voltage supply for interruptions, and a high voltage isolated DC-to-DC (HVDC) converter that supplies high voltage DC power directly to the PFC converter if the controller detects an interruption in the external AC voltage supply.

In other aspects, the invention relates to an apparatus that provides an isolated DC-to-DC power supply for an electronic device, comprising: a DC input source; a plurality of isolated DC-to-DC voltage converters that receive the input from the DC input source and generate an isolated DC output; and where the plurality of isolated DC-to-DC voltage converters are arranged in series to produce the isolated DC output.

In other aspects, the invention relates to an apparatus for providing an uninterruptible power supply for an electronic device, comprising: a DC-to-DC power supply that receives an external DC voltage supply and outputs a DC voltage to the electronic device comprising, a boost power factor correction (PFC) converter that boosts the rectified voltage from the bridge rectifier, and a line isolated DC-to-DC converter that changes the boosted voltage to the operating voltage range of the electronic device; and an uninterruptible power supply (UPS) subsystem comprising, a controller that monitors that external AC voltage supply for interruption, and a high voltage isolated DC-to-DC (HVDC) converter that supplies high voltage DC power directly to the PFC converter if the controller detects an interruption in the external AC voltage supply.

In other aspects, the invention relates to an apparatus for providing an uninterruptible power supply for an electronic device, comprising: an AC-to-DC power supply that receives an external AC voltage supply in combination with an external DC voltage supply as a backup voltage supply, where the power supply outputs a DC voltage to the electronic device comprising, a bridge rectifier that receives DC voltage from the external DC voltage supply and rectifies the voltage, a boost power factor correction (PFC) converter that boosts the rectified voltage from the bridge rectifier, and a line isolated DC-to-DC converter that changes the boosted voltage to the operating voltage range of the electronic device; and an uninterruptible power supply (UPS) subsystem comprising, a controller that monitors the external AC voltage supply for interruptions, and a high voltage isolated DC-to-DC (HVDC) converter that supplies high voltage DC power directly to the PFC converter if the controller detects an interruption in the external AC voltage supply.

In other aspects, the invention relates to an apparatus for providing an uninterruptible power supply for an electronic device, comprising: an AC-to-DC power supply that receives an external AC voltage supply in combination with an external DC voltage supply and an external battery as a backup voltage supply, where the power supply outputs a DC voltage to the electronic device comprising, a bridge rectifier that receives DC voltage from the external DC voltage supply and rectifies the voltage, a boost power factor correction (PFC) converter that boosts the rectified voltage from the bridge rectifier, and a line isolated DC-to-DC converter that changes the boosted voltage to the operating voltage range of the electronic device; and an uninterruptible power supply (UPS) subsystem comprising, a controller that monitors the external AC voltage supply for interruptions, and a high voltage isolated DC-to-DC (HVDC) converter that supplies high voltage DC power directly to the PFC converter if the controller detects an interruption in the external AC voltage supply.

Other aspects and advantages of the invention will be apparent from the following description and the appended claims.

BRIEF DESCRIPTION OF DRAWINGS

It should be noted that identical features in different drawings are shown with the same reference numeral.

DETAILED DESCRIPTION

The present invention provides a novel approach for implementing an uninterruptible power supply (UPS) that is compact, power efficient and low cost. In general, the UPS solution is applicable to any power supply that has a full range global input voltage capability of 90V-26V. The output voltage is intended to power electronic devices of a wide variety including supplemental and peripheral devices in addition to the primary device. Other embodiments of the invention are applicable to fixed input voltage power supplies. The present invention may not require to DC to AC voltage conversion present on most UPS systems and therefore may eliminate the power loss and circuitry associated with that conversion process. The advantages of the present invention are derived from leveraging the existing infrastructure of the power supply.

Figure 1:
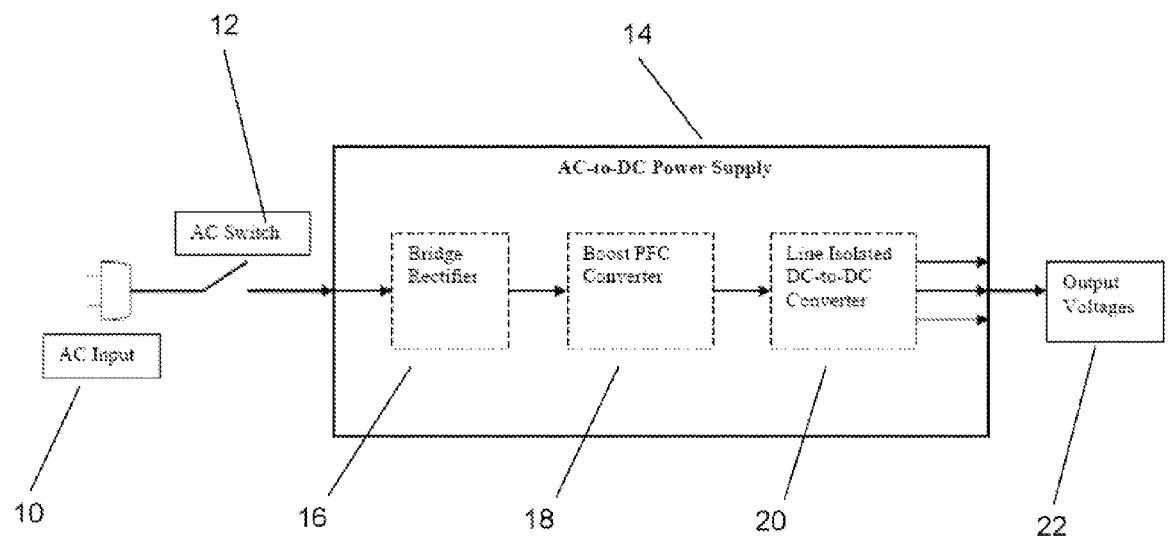
FIG. 1 shows a block diagram of an AC to DC power supply system in accordance with the prior art.
Figure 2:
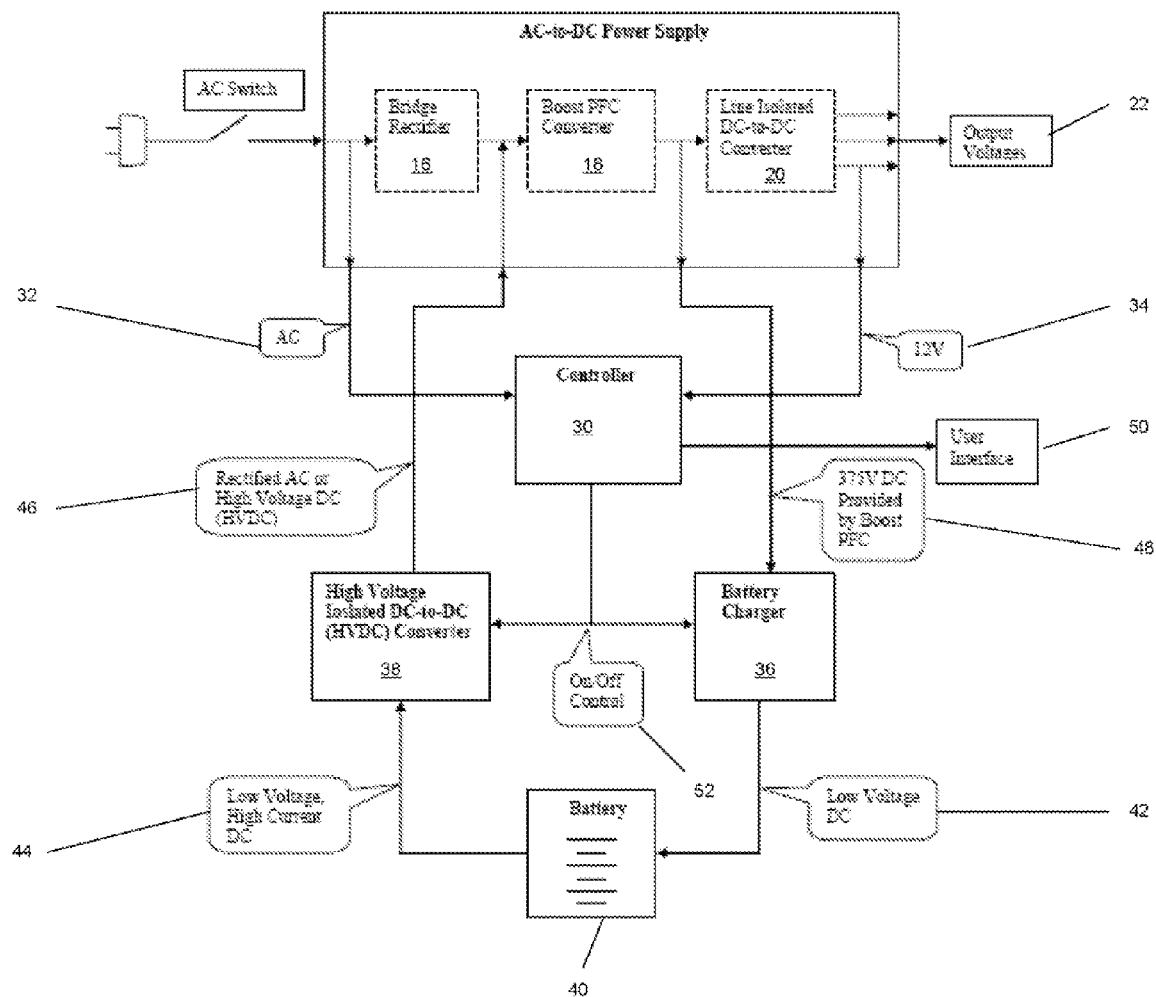
FIG. 2 shows a block diagram of a power supply system with an uninterruptible power supply in accordance with one example of the present invention.

FIG. 2 shows a block diagram of a power supply system with an uninterruptible power supply in accordance with one example of the present invention. As shown previously in the prior art system of FIG. 1, a bridge rectifier 16 in the AC-to-DC power supply 14 is used to convert the AC input to rectified, but unfiltered DC voltage. In this embodiment, the AC input 32 is sampled by a controller 30 to detect any anomalies or problems in the supply. If a problem with the AC input 32 is detected, the controller 30 switches on 52 a high voltage isolated DC-to-DC (HVDC) converter 38 that supplies a rectified AC or high voltage DC (HVDC) 46 to the input of the boost PFC converter 18. The HVDC converter 38 is supplied with a low voltage, high current DC supply 44 from a battery 40. In this embodiment, the battery is a 28 V lithium-polymer battery.

During normal operations where the AC input 32 is adequate, the controller 30 switches off 52 the HVDC converter 38. Instead, a battery charger 36 charges the battery 40 with a low voltage DC supply 42. The battery charger is powered from the output of the boost PFC converter 48. The battery charger is operating whenever AC power is applied to the power supply. Note: The battery charger will operate if the soft power switch turns off the computer but the power cord is plugged into the wall and the hard power switch 12 is closed. In this case the computer is off and the battery chargers input voltage will be in the range of 127V to 375 VDC (rectified AC input). The controller itself is controlled by a user interface 50 and is powered by a 12 V DC supply from the output of the power supply 22. In alternative embodiments, the power supply for the controller 30 could be a 5 V from a Universal Serial Bus (USB). In still other embodiments, the controller could sample the rectified AC or HVDC 46 supplied to the boost PFC converter 18 to monitor battery performance and the health of the power supply. Additional functions of the controller 30 may include logging historical data of power performance. The historical data may be recalled to assist in troubleshooting the system. Also, the controller 30 may conduct an orderly shutdown of system peripherals through the USB for preserving data integrity.

By injecting a DC voltage after the bridge rectifier the present invention does not require a DC to AC conversion process. An added advantage is that the bridge rectifier provides an input "OR-ing" function. This enables the power system to be driven from the standard AC power source of the UPS system or both simultaneously. This makes the UPS control circuitry easy to implement and resilient during brown out conditions.

The boost power factor correction (PFC) converter 18 shown in FIG. 2 is used to provide power factor correction and also to provide a wide compliance range for acceptable AC input. The UPS system of the present invention takes advantage of this wide compliance range provided by the PFC converter circuitry. The UPS system can supply any loosely regulated voltage before the PFC converter and rely on the PFC converter to boost and regulate the voltage for the rest of the power system. Since the UPS only requires loose regulation an open-loop converter can be design which is very efficient and requires few components.

The UPS technique of Pre-Boost converter HVDC injection uses a loosely regulated high voltage DC (HVDC) that is generated from a battery and supplied before the PFC converter circuitry. The high voltage DC (HVDC) should be less than the maximum AC line voltage to guarantee there is not an excessive voltage stress on the components in the power supply. For auto-ranging power supplies, the maximum rectified AC voltage is typically 264V RMS or 374V peak in this embodiment. The minimum voltage for the HVDC is determined by the power supply loading. For full load, the minimum voltage for the HVDC is the minimum RMS voltage specified for the power supply. For auto-ranging power supplies this minimum is 90V RMS or 127V peak. Therefore, the compliance range of the generated HVDC is between 90 VDC and 374 VDC.

An alternative embodiment would eliminate the use and need for a HVDC converter and have only an acceptably high voltage battery or energy storage component. This embodiment would directly connect the battery before the PFC converter circuit and eliminate any other voltage or power conversions processes in the UPS system. Available battery sources typically limit this between 12 VDC and 56 VDC so a DC-to-DC converter is typically required.

It should be understood that the HVDC converter and UPS may be used with other types of power input supplies and combinations of power input supplies in addition to an AC input 10. For example, the AC input 32 shown in FIGS. 2 and 3 could instead by a low voltage DC lower source such as 28V from a vehicle power supply. In other embodiments, the input 32 could be a combination of AC and DC input. In this example, the external AC source would be the primary supply while the DC source would be backup. In particular, this would be used for vehicular mounted electronic devices so that the DC source would be the 28 V vehicular power supply. In the embodiments using a DC source, the PFC converter 18 should be qualified to handle DC input. Other alternatives include the use of an external battery as a supplemental backup supply to either and AC or DC input. Also, the three types of sources could conceivably be used in combination as an AC/DC/Battery source. In each of these combinations, the controller 30 may include data logic to analyze the input and determine when to switch on and off the HVDC.

Figure 3:
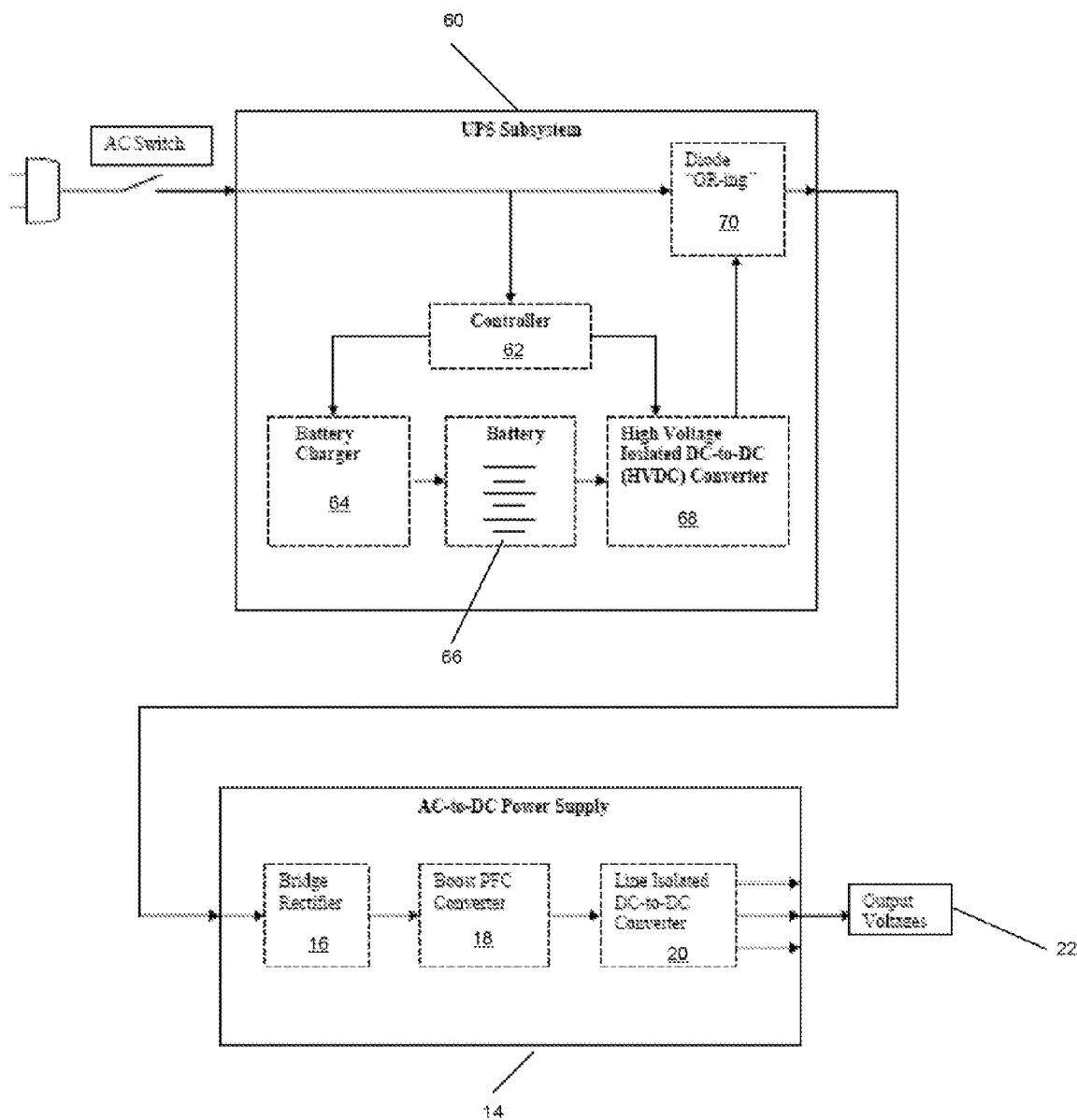
FIG. 3 sows a block diagram of a power supply system with an uninterruptible power supply in accordance with an alternative example of the present invention.

Another alternative embodiment of the present invention is shown in FIG. 3. This embodiment does not require any modifications to the standard power system. Instead, the UPS subsystem 60 is a self contained unit that is located in series between the AC power input and the AC-to-DC power supply 14. In this embodiment, the UPS subsystem may be retrofitted to existing power supply systems.

This alternative approach applies a high voltage DC 68 to the normally AC input of a standard power supply 14. Again, the high voltage DC 68 can be loosely regulated due to the boost power factor correction converter circuit 18 in the standard power supply. This approach requires the additional circuitry for "OR-ing" 70 or multiplexing between the AC and UPS power feeding the external power. This approach may be less efficient due to the inherent losses in the power supply bridge rectifier.

Figure 4:
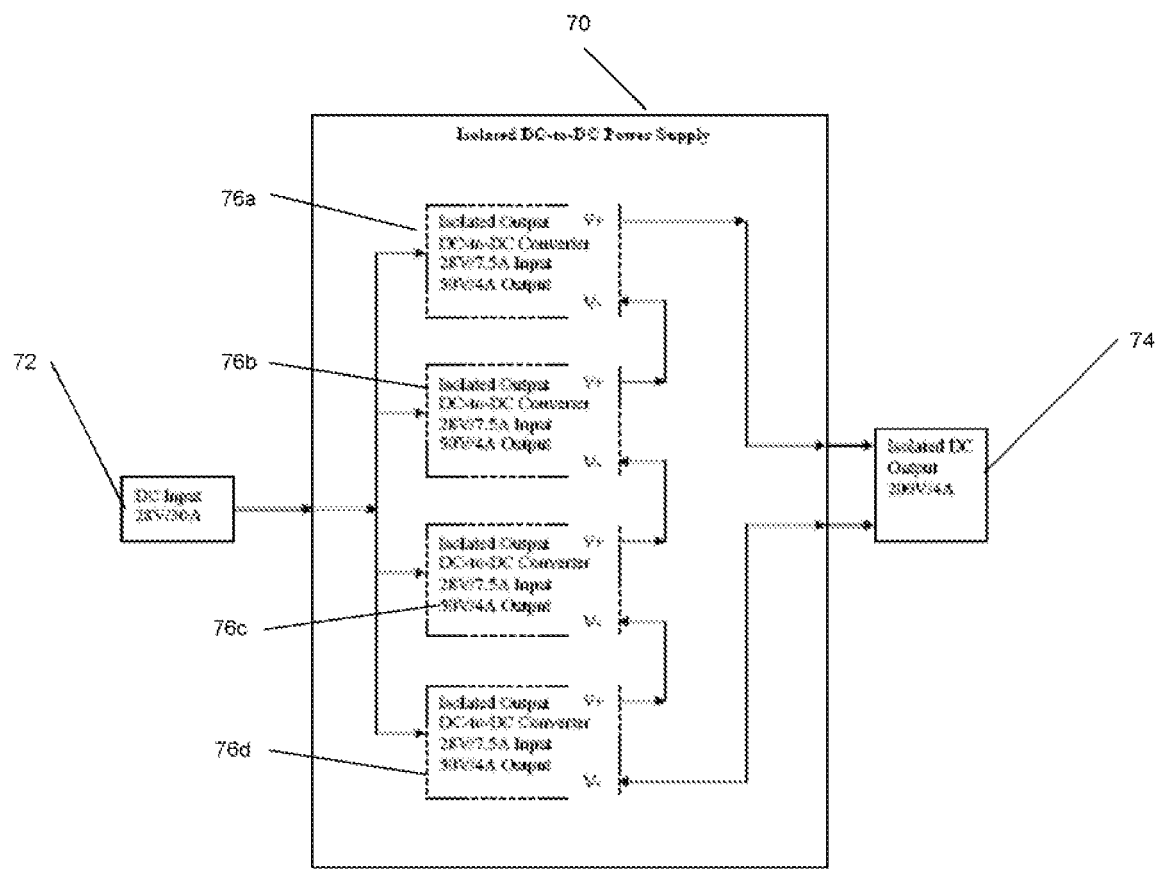
FIG. 4 shows a block diagram of DC to DC converter in accordance with one example of the present invention.

An additional embodiment of the present invention is a high power and high voltage DC-to-DC (HVDC) converter using a novel approach of combining several lower power DC-to-DC converters in series. FIG. 4 shows a block diagram of a DC-to-DC converter in accordance with one example of the present invention. In this embodiment, the individual low power converters 76a-76d are cascaded in a series arrangement to produce a common high voltage, high current and high power output 74. In the embodiment shown, the input 72 is a DC input of 28V/30 A and the output 74 is an isolated DC output of 200V/4 A. This series DC-to-DC converter is most advantageous when the desired output voltage is greater than the input voltage.

The advantages of the series DC-to-DC converter topology are derived from using relative low voltage power components instead of the high voltage components required for the parallel topology. Electrical components that are created for high voltage and high current area necessarily high power components and expensive. By using low voltage and lower power devices each converter can be optimized for cost and size and efficiency. Each individual DC-to-DC converter can achieve a high efficiency which enables an overall high efficiency for the complete high power converter.

It is important to note that the high voltage output is divided evenly across each individual low voltage converter 76a-76d. This is an important point and each low voltage converted should be capable of regulating its isolated output. The series arrangement also forces the same load current through each individual converter. With equivalent output voltage and current for each individual low voltage converter, lower sharing between each converter is accomplished. This power sharing capability is ideal when multiple converter outputs need to be combined. Also, it is important to realize what will occur when an individual converter fails. If the individual to realize what will occur when an individual converter fails. If the individual converter fails in a "short" condition the overall converter continues to operate, but at a reduced output voltage condition. If an individual converter fails in an "open" condition, power is no longer delivered to the output. By knowing this failure behavior, a redundant fail safe system can be designed.

Figure 5:
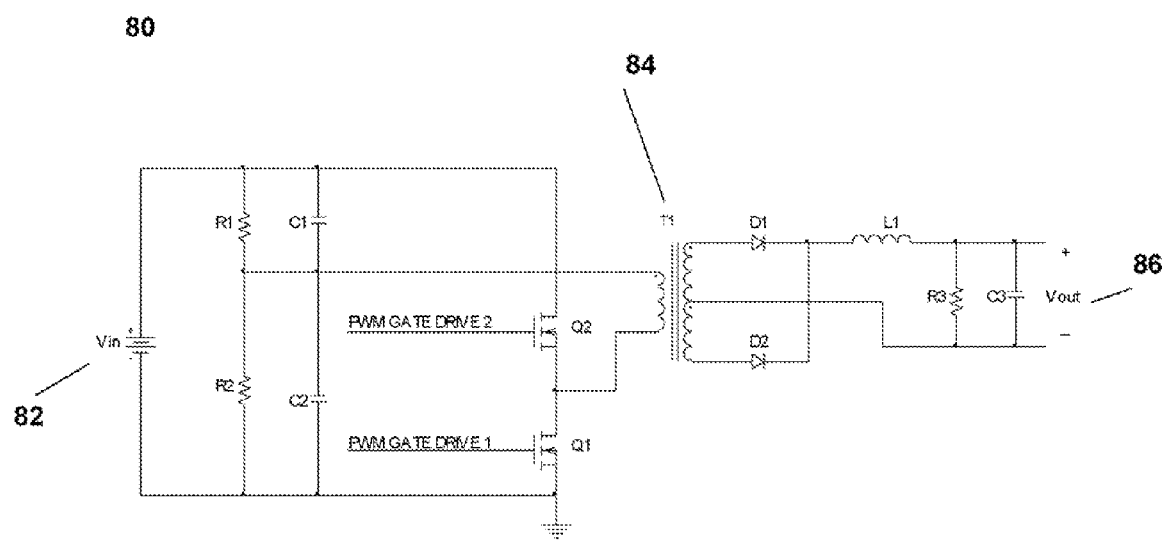
FIG. 5 shows a detailed schematic diagram of a DC to DC converter shown in FIG. 4.

Each individual low voltage converter 76a-76d uses a transformer within each low voltage converter. The circuit is divided into a "primary" section that operates at the input voltage (28V) and input current (7.5 A) and an isolated "secondary" section that operates at the output voltage (50V) and output current (4 A). A half-bridge power conversion topology was utilized but other topologies are possible. Also, the present invention may operate each converter open-loop which enables a common control circuit to drive all converters. The schematic for the individual low voltage converter 80 is shown in FIG. 5. The converter is shown with the input voltage 82 (Vin), the transformer 84 (T1), and the output voltage 86 (Vout). Another possible embodiment uses a single transformer with multiple output windings and a single input winding. With this embodiment, the advantages of the series topology are retained for the secondary windings but the primary current requirements increase to the full input specification.

A HVDC converter designed in accordance with the present invention was able to utilized inexpensive 48V components that were specifically developed for the telecom industry to generate a 200V, 4A output. By utilizing high efficiency components an overall power conversions efficiently greater than 90% as achieved at an optional price and form factor.

While the invention has been described with respect to a limited number of embodiments, those skilled in the art, having benefit of this disclosure, will appreciate that other embodiments can be devised which do not depart from the scope of the invention as disclosed here. Accordingly, the scope of the invention should be limited only by the attached claims.

What is claimed is:

1. An apparatus for providing an uninterruptible power supply for an electronic device, comprising:
    (a.) an AC-to-DC power supply that receives an external AC voltage supply and outputs a DC voltage to the electronic device comprising,
        a bridge rectifier that receives AC voltage from the external AC voltage supply and rectifies the voltage,
        a boost power factor correction (PFC) converter that boosts the rectified voltage from the bridge rectifier, and
        a line isolated DC-to-DC converter that changes the boosted voltage to the operating voltage range of the electronic device; and
    (b.) an uninterruptible power supply (UPS) subsystem comprising,
        a controller that monitors the external AC voltage supply for interruptions, and
        a high voltage isolated DC-to-DC (HVDC) converter that supplies high voltage DC power directly to the PFC converter if the controller detects an interruption in the external AC voltage supply.

2. The apparatus of claim 1, where the UPS subsystem further comprises:
    a battery that supplies the HVDC converter; and
    a battery charger that charges the battery with power from the PFC converter when the HVDC converter is not in use.

3. The apparatus of claim 1, where the controller is powered by a universal serial bus (USB).

4. The apparatus of claim 1, where the controller logs historical performance data of the apparatus.

5. The apparatus of claim 1, where the UPS subsystem is located in series between the external AC voltage supply and the AC-to-DC power supply, where the UPS subsystem provides input to the bridge rectifier.

6. The apparatus of claim 2, where the battery charger is controlled by the controller.

7. The apparatus of claim 2, where battery directly supplies the boost PFC converter with high voltage DC power.

8. The apparatus of claim 3, where the universal serial bus provides 5 volts of power.

9. The apparatus of claim 3, where the controller implements an orderly shutdown of the electronic device through the USB in order to preserve data integrity.

10. An apparatus that provides an isolated DC-to-DC power supply for an electronic device, comprising:
    (a.) a DC input source; and
    (b.) a plurality of isolated DC-to-DC voltage converters that receive the input from the DC input source and generate an isolated DC output, where the plurality of isolated DC-to-DC voltage converters are arranged in series to produce the isolated DC output.

11. The apparatus of claim 10, where the isolated DC output is evenly balanced across the isolated DC-to-DC voltage converters.

12. The apparatus of claim 10, where the isolated DC-to-DC voltage converters utilizes half-bridge power conversion topology.

13. The apparatus of claim 10, where the isolated DC-to-DC voltage converters operate in an open-loop which enables a common control circuit to drive all of the isolated DC-to-DC voltage converters.

14. The apparatus of claim 10, where the isolated DC-to-DC voltage converters use a single transformer with multiple output windings and a single input winding.

15. An apparatus for providing an uninterruptible power supply for an electronic device, comprising:
 (a.) a DC-to-DC power supply that receives an external DC voltage supply from a vehicle power supply and outputs a DC voltage to the electronic device comprising,
  a bridge rectifier that receives DC voltage from the external DC voltage supply and rectifies the voltage,
  a boost power factor correction (PFC) converter that boosts the rectified voltage from the bridge rectifier, and
  a line isolated DC-to-DC converter that changes the boosted voltage to the operating voltage range of the electronic device; and
 (b.) an uninterruptible power supply (UPS) subsystem comprising,
  a controller that monitors the external AC voltage supply for interruptions, and
  a high voltage isolated DC-to-DC (HVDC) converter that supplies high voltage DC power directly to the PFC converter if the controller detects an interruption in the external AC voltage supply.

16. The apparatus of claim 15, where the UPS subsystem further comprises:
 a battery that supplies the HVDC converter; and
 a battery charger that charges the battery with power from the PFC converter when the HVDC converter is not in use.

17. The apparatus of claim 15, where the external DC voltage supply is 28 volts.

18. An apparatus for providing an uninterruptible power supply for an electronic device, comprising:
 (a.) an AC-to-DC power supply that receives an external AC voltage supply in combination with an external DC voltage supply from a vehicle power supply as a backup voltage supply, where the power supply outputs a DC voltage to the electronic device comprising,
  a bridge rectifier that receives DC voltage from the external DC voltage supply and rectifies the voltage,
  a boost power factor correction (PFC) converter that boosts the rectified voltage from the bridge rectifier, and
  a line isolated DC-to-DC converter that changes the boosted voltage to the operating voltage range of the electronic device; and
 (b.) an uninterruptible power supply (UPS) subsystem comprising,
  a controller that monitors the external AC voltage supply for interruptions, and
  a high voltage isolated DC-to-DC (HVDC) converter that supplies high voltage DC power directly to the PFC converter if the controller detects an interruption in the external AC voltage supply.

19. The apparatus of claim 18, where the UPS subsystem further comprises:
 a battery that supplies the HVDC converter; and
 a battery charger that charges the battery with power from the PFC converter when the HVDC converter is not in use.

20. The apparatus of claim 18, where the external DC voltage supply is 28 volts.

21. An apparatus for providing an uninterruptible power supply for an electronic device, comprising:
 (a.) an AC-to-DC power supply that receives an external AC voltage supply in combination with an external DC voltage supply from a vehicle power supply and an external battery as a backup voltage supply, where the power supply outputs a DC voltage to the electronic device comprising,
  a bridge rectifier that receives DC voltage from the external DC voltage supply and rectifies the voltage,
  a boost power factor correction (PFC) converter that boosts the rectified voltage from the bridge rectifier, and
  a line isolated DC-to-DC converter that changes the boosted voltage to the operating voltage range of the electronic device; and
 (b.) an uninterruptible power supply (UPS) subsystem comprising,
  a controller that monitors the external AC voltage supply for interruptions, and
  a high voltage isolated DC-to-DC (HVDC) converter that supplies high voltage DC power directly to the PFC converter if the controller detects an interruption in the external AC voltage supply.

22. The apparatus of claim 21, where the UPS subsystem further comprises:
 a battery that supplies the HVDC converter; and
 a battery charger that charges the battery with power from the PFC converter when the HVDC converter is not in use.

23. The apparatus of claim 21, where the external DC voltage supply is 28 volts.

* * * * *